United States Patent [19]

Myers

[11] Patent Number: 5,101,869
[45] Date of Patent: Apr. 7, 1992

[54] EMERGENCY VENTING CAP AND FUNNEL ASSEMBLY

[75] Inventor: Donald J. Myers, Dartmouth, Canada

[73] Assignee: King Metal Fabricators, Ltd., Dartmouth, Canada

[21] Appl. No.: 584,915

[22] Filed: Sep. 19, 1990

[51] Int. Cl.⁵ .............................................. B67C 11/00
[52] U.S. Cl. ..................................... 141/339; 141/86; 141/297; 141/331; 220/334; 220/366; 70/164
[58] Field of Search ........... 141/86, 331, 339, 297–300; 220/203, 208, 209, 244, 324, 315, 316, 322, 334, 337, 344, 366, 367, DIG. 27; 70/159, 164, 166

[56] References Cited

U.S. PATENT DOCUMENTS

| | | | |
|---|---|---|---|
| 358,732 | 3/1887 | Clisbee | 70/164 |
| 1,365,720 | 1/1921 | Olson | 220/366 X |
| 1,982,118 | 11/1934 | Nerem | 220/203 |
| 1,989,300 | 1/1935 | Webb | 220/334 |
| 2,681,165 | 6/1954 | Kornhauser | 220/334 |
| 2,718,344 | 9/1955 | Troster | 141/86 |
| 2,845,059 | 7/1958 | Kelleher | 220/366 |
| 3,008,483 | 11/1961 | Beckwith | 220/208 |
| 3,093,263 | 6/1963 | Mabry | 220/334 |
| 3,930,389 | 1/1976 | Buikus | 70/164 |
| 4,338,983 | 7/1982 | Hatcher | 141/331 |

FOREIGN PATENT DOCUMENTS

| | | |
|---|---|---|
| 486684 | 9/1952 | Canada . |
| 1249932 | 2/1989 | Canada . |
| 264930 | 1/1927 | United Kingdom ................ 220/366 |

Primary Examiner—Ernest G. Cusick
Attorney, Agent, or Firm—Whitham & Marhoefer

[57] ABSTRACT

The invention relates to a combined funnel and cap member which can be attached to containers for receiving waste fluid such as fuel or lubricating oils. The cap member is pivotally attached to a funnel body and can be latched to the funnel body opposite the hinge mechanism. The hinge mechanism or the latch mechanism is constructed in such a manner as to permit the cap member to rise relative to the funnel body in the event of overpressures within the container so as to provide an emergency venting path for gases under pressure within the container. Once the overpressure condition has been relieved the cap member will return to its normally closed position under its own weight. The cap member can be unlatched from the funnel body and opened so that fluids may be introduced into the container therebelow.

17 Claims, 4 Drawing Sheets

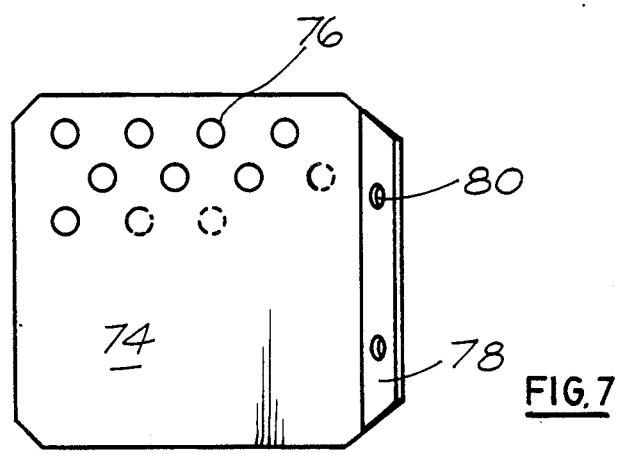
FIG. 7
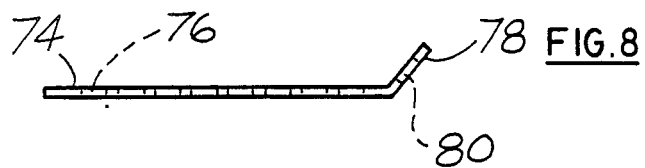
FIG. 8
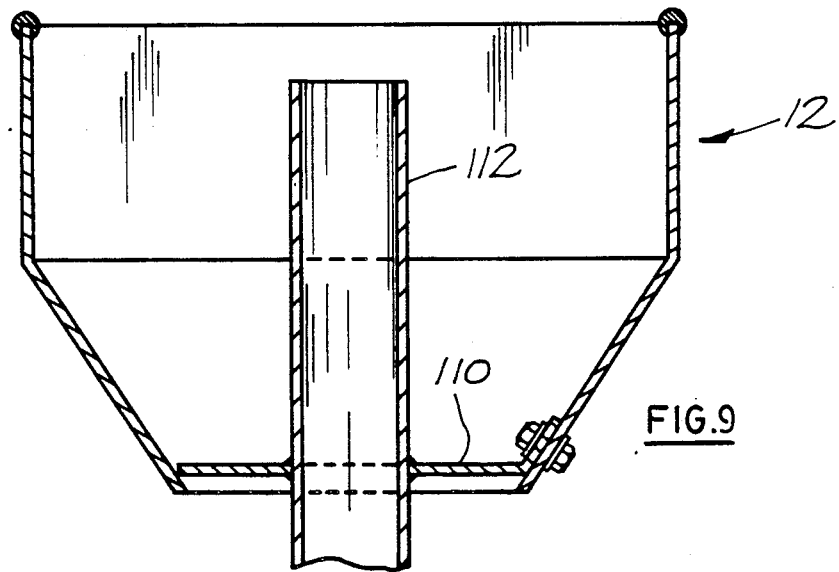
FIG. 9
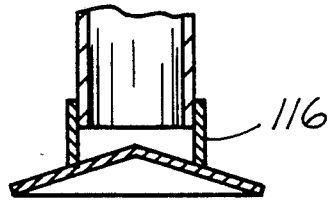

EMERGENCY VENTING CAP AND FUNNEL ASSEMBLY

The present invention relates to an emergency venting cap and funnel assembly.

BACKGROUND OF THE INVENTION

Most harbours now provide waste containment receptacles into which marine operators, such as fishermen, are required to dump waste fluids including used lubricating oils and bilge fluids. Such fluids, if dumped into the sea would damage the environment and it is necessary to avoid such unwanted pollution. The waste fluids must therefore be collected on board the vessels while at sea and then pumped into containment receptacles in the harbour for subsequent disposal. Inasmuch as the waste fluids contain volatile substances, including hydrocarbons, it is essential that the containment vessels be vented to prevent explosive overpressure conditions from developing.

Most containment receptacles are provided with an inlet, an outlet and a vent stack. Usually the vent stack will be sufficient for the venting of air during filling and for the normal venting of volatile gases that may be generated within the receptacle. However there is a need for additional venting under emergency overpressure conditions, conditions which may develop more frequently with greater use of such waste containment receptacles.

SUMMARY OF THE INVENTION

The present invention addresses the problem identified above by providing an emergency venting assembly which also doubles as a funnel for the introduction of fluids into a container to which it is attached. The assembly includes a funnel body for attachment to the container or receptacle, and a cap member which normally closes the funnel body to prevent unwanted material or fluids (e.g., rain) from entering the container. The cap member has a depending skirt that peripherally encompasses the upper portion of the funnel body and it is both pivotally connected and loosely releasably latched to the funnel body. In one embodiment the hinge mechanism allows the cap member to rise slightly relative to the funnel body to allow gases to vent past the cap member and funnel body. In another embodiment the latch mechanism is sufficiently loose that the cap member can rise slightly for venting purposes. In each case, however, the venting movement of the cap member is restrained or limited by the latch mechanism to prevent unwanted access to the container via the funnel body. The latch mechanism will normally include a lock which can be unlocked to permit movement of the cap member from its closed position to an open position for the pouring of fluid into the container. When the lock is locked emergency venting can take place but access to the funnel body is denied by the cap member. The assembly of this invention will provide emergency venting at overpressures as low as ½ p.s.i.a.

In summary, therefore, the present invention may be considered as providing a combination funnel and vent cap comprising: a funnel body adapted for attachment to a fluid-receiving container; a cap member including a top wall and a skirt depending therefrom, the skirt being sized to peripherally encompass an upper wall portion of the funnel body when the top wall is in a closed position preventing access to the funnel body; hinge means pivotally connecting the cap member to the funnel body and permitting movement of the cap member between the closed position and an open position; latch means opposite the hinge means for loosely securing the cap member to the funnel body; and at least one of the hinge means and the latch means being provided with means to permit the cap member to rise slightly relative to the funnel body for venting purposes without providing access to the funnel body.

BRIEF DESCRIPTION OF THE DRAWINGS

FIGS. 7 and 8 show plan and end views respectively of a filter plate used with this invention; and FIG. 9 shows the use of a modified filter plate.

DESCRIPTION OF THE PREFERRED EMBODIMENT

Figure 1:
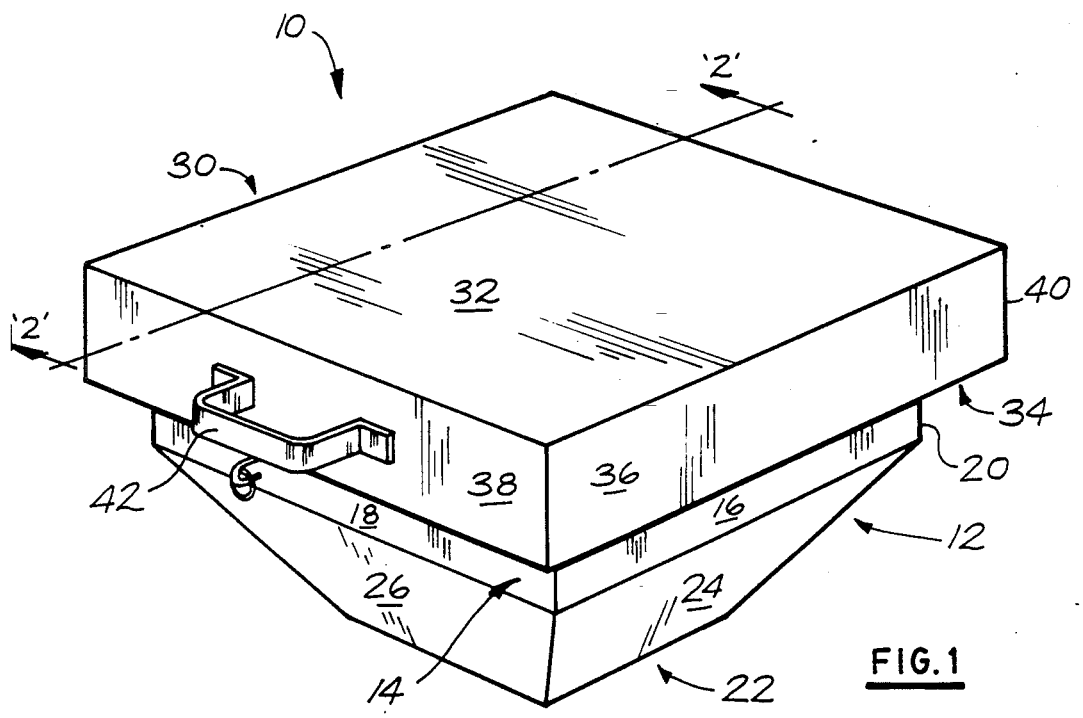
FIG. 1 is a perspective view of one embodiment of the combined funnel and cap of the present invention.

FIG. 1 of the drawings illustrates a combined funnel and venting cap 10 in accordance with the present invention. A funnel body 12 includes a peripherally upstanding upper wall portion 14 shown as including side walls 16, a front wall 18 and a rear wall 20. The funnel body also includes a lower wall portion 22 which converges downwardly from below the upper wall portion 14. The lower wall portion includes side wall portions 24, a front wall portion 26 and a rear wall portion 28, such portions corresponding to and sloping downwardly and inwardly from the side, front and rear walls of the upper wall portion. Although the funnel body 12 is shown as being generally rectangular or square it is clear that the funnel body could have other configurations, such oval or circular.

The present invention also includes a cap member 30 having a top wall 32 and a peripheral skirt 34 depending from the top wall 32. The skirt 34 is sized to peripherally encompass the upper wall portion 14 of the funnel body 12 when the cap member rests on the upper wall portion. This is clearly shown, for example, in FIGS. 1 and 2. The skirt 34 includes side wall portions 36, a front wall portion 38 and a rear wall portion 40. A U-shaped handle 42 is shown as being attached to the front wall portion 38 of the skirt 34. The handle may be secured by welding, machine screws, bolts or rivets.

Figure 2:
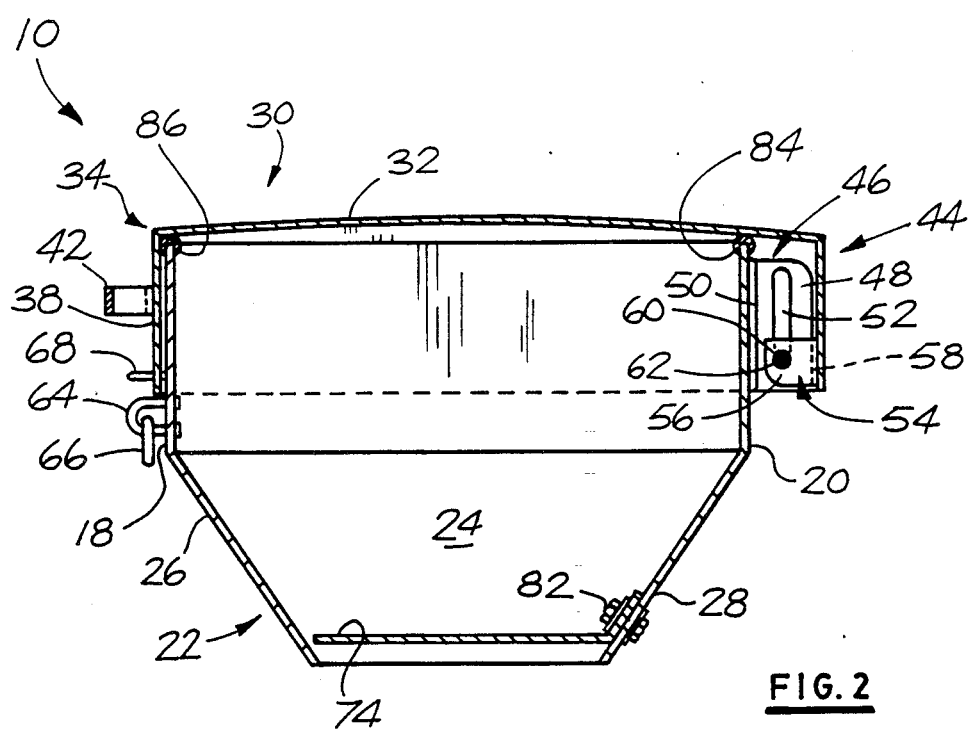
FIG. 2 is a cross-section on the line 2—2 of FIG. 1.

As shown in FIG. 2, for example, the top wall 32 of the cap member 30 may be slightly curved from front to rear or it may be domed or flat.

The cap member 30 is pivotally connected to the funnel body by way of a hinge mechanism 44. That hinge mechanism can take several forms as will be illustrated in FIGS. 2 through 6.

Figure 3:
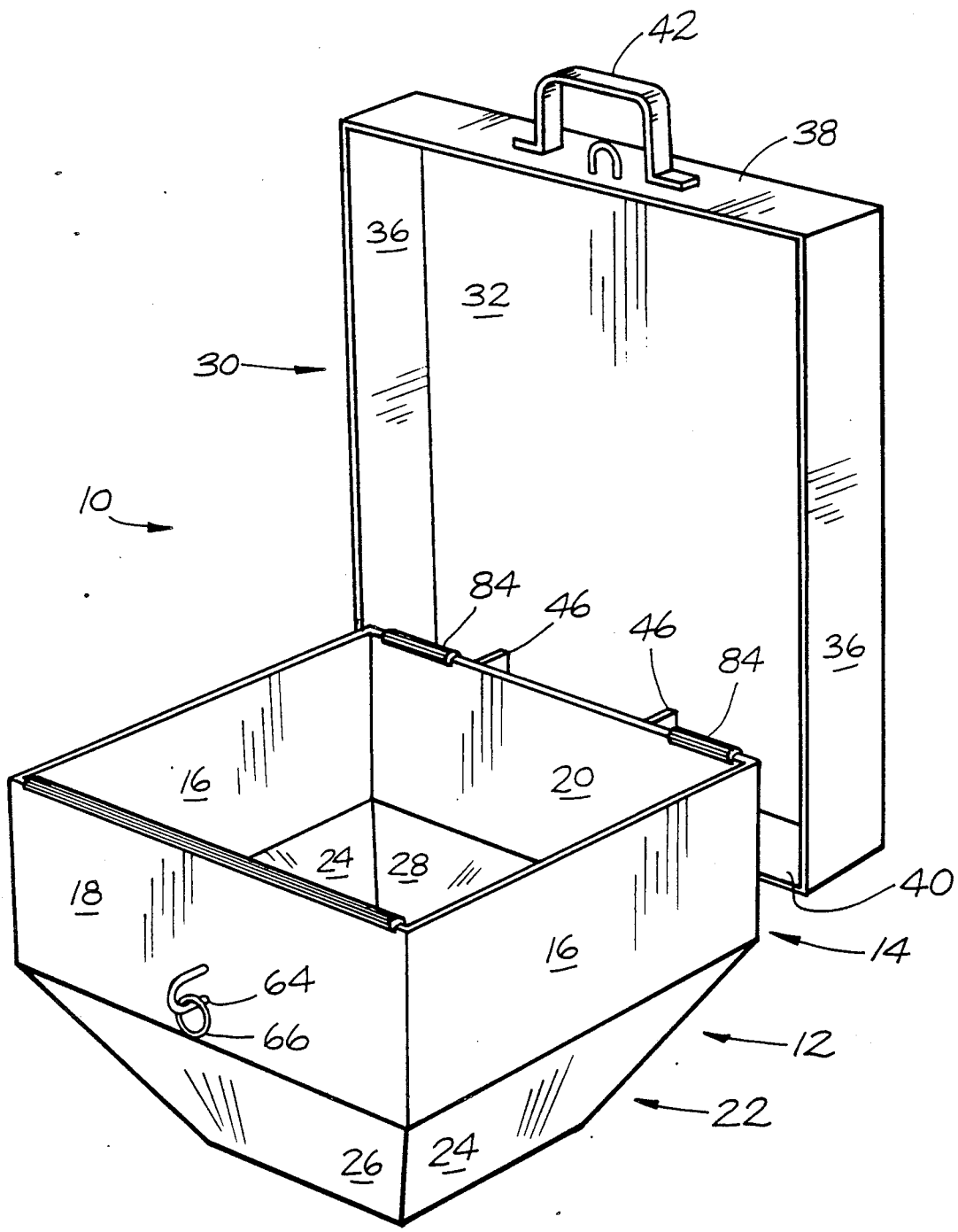
FIG. 3 is a perspective view of the embodiment of FIG. 1 in an open condition.
Figure 4:
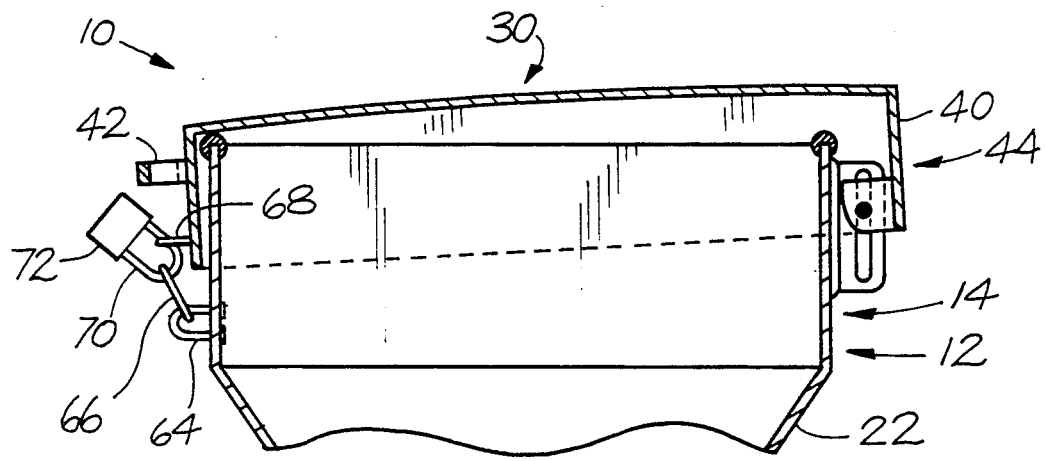
FIG. 4 is a cross-section similar to FIG. 2 but showing the venting position of the first embodiment.

In the embodiment of FIGS. 2, 3 and 4 the hinge mechanism 44 involves a pair of rearwardly projecting bracket members 46 spaced apart along the rear wall 20 of the upper wall portion 12. Each bracket member 46 is shown as being vertically elongated and including a rearwardly projecting leg portion 48 and a second leg portion 50 abutting the rear wall 20. The leg portion 50 may be welded or otherwise secured to the rear wall 20. Furthermore, the bracket member 46 is shown as having a vertically elongated slot 52 therein.

The cap member 30 is also shown as having a pair of spaced apart inwardly projecting brackets 54, each bracket 54 being located so as to be positioned adjacent a corresponding bracket member 46. Each bracket 54 includes an inwardly projecting leg portion 56 and a second leg portion 58 which is welded or otherwise secured to the inside surface of the rear wall portion 40 the skirt 34. Each bracket 54 includes a circular through-hole 60. A rod 62 extends through the holes and slots 52 so as to pivotally connect the bracket members 54 and 46 together. The rod 62 is sized so that it will freely slide in the slot 52.

A U-bolt 64 is secured to the front wall 18 of the upper wall portion 12 below the lower edge of the front skirt wall portion 38. A link 66 of a chain is preferably captured by the U-bolt 64 so that it is loosely connected thereto. A second U-bolt 68 is attached to the front wall 38 of the skirt 34 so that, as shown in FIG. 4, the hasp 70 of a lock 72 can be passed through the link 66 and the U-bolt 68 to thereby latch the cap member 30 to the funnel body 12 to prevent undesired opening of the cap member.

Preferably, the funnel body 12 will be provided with a filter plate 74 shown in FIGS. 2, 7 and 8. The filter plate 74 is a flat plate of sheet steel material provided with a plurality of through-holes 76. The holes 76 permit fluid, such as waste oil, to pass therethrough into whatever container the funnel may be attached to while preventing solid objects from passing into the container. The filter plate 74 is also provided with an upturned edge portion 78 having through-holes 80 for reception of bolts 82 used to secure the filter plate 74 to the lower wall portion 22 of the funnel body 12.

The operation of the combined funnel and cap of the present invention will now be described with respect to FIGS. 1 through 4.

The funnel body 12 of this invention will undoubtedly be welded or otherwise secured to a barrel or other container which is adapted to receive liquids such as waste oil or fuel. Such a container is not shown and neither is the mechanism by which the funnel body 12 would be attached to such a container. The attachment mechanism is well within the purview of a skilled engineer. However, once the funnel body 12 has been secured to such a container and the cap member 30 pivotally connected to the funnel body 12 by way of the hinge mechanism 44 the structure of the present invention will be in condition for full utilization.

In FIG. 1 the cap member 30 is shown as being in a closed condition. In that condition the cap member may be locked to the funnel body by way of a lock 72 as shown in FIG. 4. In such a condition it would not be possible for anyone to open the cap so as to place fluid within the container. When it is desired, however, to pour waste material into the container one need only undo the lock 72 to permit upward and rearward opening of the cap member 30, utilizing the handle 42, to place the cap member 30 in the open position shown in FIG. 3. Waste fluid may then be poured into the funnel 12, the fluid passing through the filter plate 74 into the container. Any solid waste material will be blocked by the body of the filter plate from passing into the container. The solid material can be readily removed from the surface of the filter plate as desired.

Once the fluid has been placed into the container the cap member 30 is returned to its normal closed position and, if desired, the lock 72 is replaced so as to prevent opening of the cap member. Preferably, the top wall 32 of the cap member will rest on resilient rubber spacer strips 84 and 86 which are placed on the upper edges of the rear and front walls 20 and 18 respectively. By utilizing the strips 84,86, there is a slight gap created between the top wall of the cap member 30 and the upper edges of the upper wall portion 14 so as to permit the flow of air and/or gases between the cap 30 and the funnel body 12, thereby normally allowing the container to remain at atmospheric pressure.

Should, however, there be an overpressure condition within the container, which condition is not alleviated by any other normal venting stacks, the arrangement of the present invention will help to ensure that such overpressure does not get sufficiently great so as to pose a danger to the container. Should there be an overpressure within the container, that overpressure will be transmitted to the underside of the top wall 32 and the cap member 30 will be allowed to rise under the influence of such overpressure through the hinge mechanism 44. As the pressure against the under surface of the top wall 32 increases the cap will rise with the pivot rod 62 sliding upwardly within the slots 52 of the bracket members 46. The higher pressure gases within the container can then escape more readily through the increased gap between the cap member and the funnel body until such time as the overpressure condition is fully alleviated. The cap member then will move downwardly again under its own weight to take up the normal condition as shown in FIG. 2. Even with the lock 72 in place the present invention will be fully operable inasmuch as the lock actually then will act as a hinge, the main movement of the cap member occurring in the vicinity of the hinge mechanism 44.

If the overpressure results from combustion of the container contents then the filter plate 74 will also act as a flame arrestor, thereby helping to keep the fire within the container itself.

Figure 5:
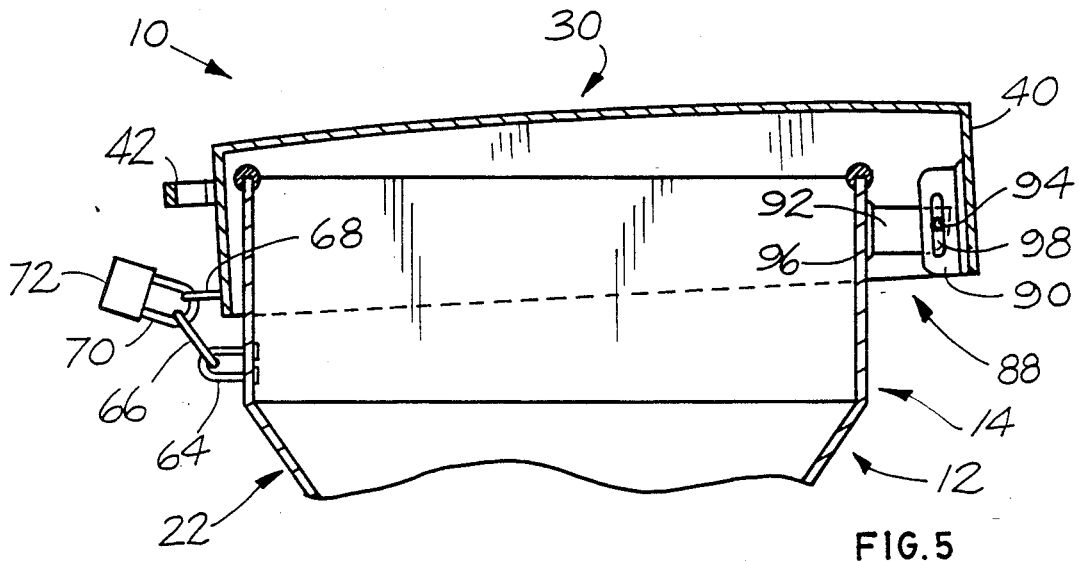
FIG. 5 is a view similar to FIG. 4 showing the venting position of a second embodiment.
Figure 6:
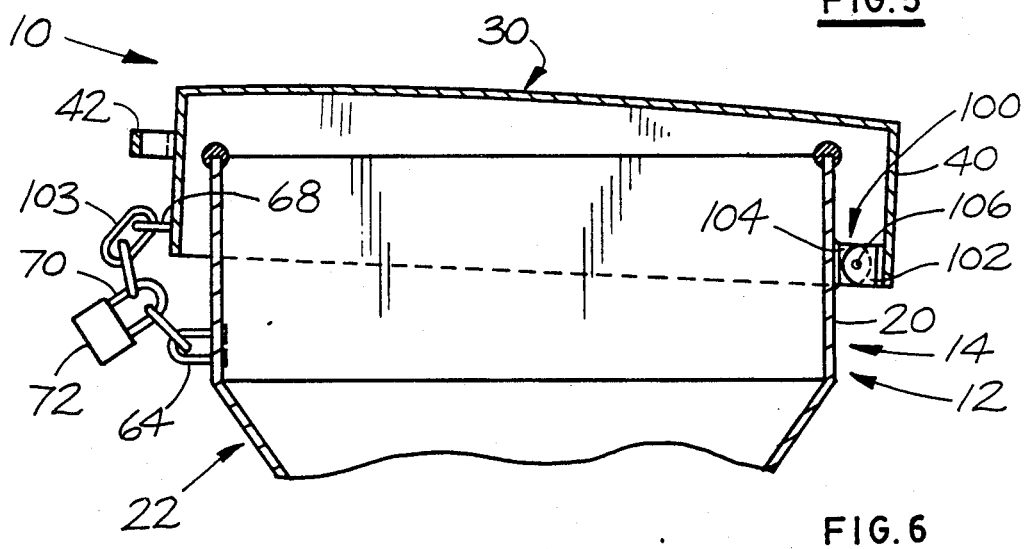
FIG. 6 is a view showing the venting position of a third embodiment.

FIGS. 5 and 6 show two alternative embodiments of the present invention which will still achieve the same end results. In FIG. 5 the hinge mechanism 44 is replaced by a new hinge mechanism 88. This mechanism is essentially the opposite of the hinge mechanism 44, with a slotted bracket 90 being secured to the rear wall 40 of the cap member 30 and a second bracket 92, having a simple through-hole 94 therein being secured to the rear wall 20 of the funnel body 12. A pivot rod 96 extends through the respective holes 94 and slots 98 so as to pivotally connect the cap 30 to the funnel body 12. The rod 96 must be displaced rearwardly of the wall 20 by a distance greater than the distance from the bottom edge of the rear wall 40 to the top of the slot 98 to ensure that the cap member can stand upright on its own when it is opened for the introduction of fluid into the container. In an overpressure condition the cap member 30 will again pivotally slide upwardly with the slotted bracket 90 sliding on the pivot rod 96. Once the overpressure condition has been alleviated the cap member 30 will slide downwardly under its own weight to its normal closed condition.

In the embodiment of FIG. 6 a hinge mechanism 100 is utilized, this mechanism involving simple spaced apart brackets 102 and 104 secured to the walls 40 and 20 respectively. The brackets are positioned so that bracket 102 is at the bottom edge of wall 40 and bracket 104 is positioned opposite bracket 102 when the cap member 30 is resting on the funnel body 12. This allows the cap member to stand upright on its own when it is opened to admit fluid into the container.

A pivot rod 106 extends between the brackets 102,104 to pivotally attach the cap member 30 to the funnel body 12. Neither of the brackets 102,104 is slotted and hence there will be no sliding movement between the cap member 30 and the funnel body 12 at the hinge 100. However, instead of a single link 66 being attached to the U-bolt 64 as in the earlier embodiments the present embodiment utilizes a multi-link chain 108 along with a lock 72 to connect the U-bolt 64 on the funnel body 12 to the U-bolt 68 on the cap member 30. This makes for a very loose locking connection between the cap member and the funnel body 12 so that when there is an overpressure condition within the container the cap member 30 can rise at the front thereof rather than at the rear thereof as with the other embodiments. The cap member 30 would merely pivot on the hinge mechanism 100 with there being enough leeway afforded by the latch mechanism to create a larger gap between the cap member 30 and funnel body 12 for relief of overpressure. The chain portion 108 is sufficiently short, however, to prevent the cap member 30 from being raised so far as to permit the unwanted deposit of material within the funnel body 12.

Another alternative for use with the present invention is illustrated in FIG. 9 wherein a modified filter plate 110 is shown. The filter plate 110 is generally constructed like the filter plate 74 with the exception that it has a cylindrical member 112 passing therethrough. The cylindrical member 112 has several functions. It can be used to receive liquid material being introduced into a container therebelow or it can also serve as an overflow regulator so that if someone were to fill up the funnel 12 too quickly there would be a less-restricted access to the container by way of the member 112. Furthermore, should liquid material within the container bubble up or otherwise attempt to move vertically up the member 112 it will flow back over the upper edge thereof through the filter plate 110 and back into the container therebelow. As seen in FIG. 9 the member 112 terminates below the upper edge of the funnel body 12. At its bottom end the member 112 has a frustoconical diffusor 114 welded thereto by spaced apart straps 116, the diffusor spreading fluid introduced through the member 112 and preventing such fluid from unduly wearing the bottom of the container.

The combined funnel and cap of the present invention provides an emergency venting safety feature for use with containers which would normally be used to receive volatile fluids. It is simple to construct and should be reasonably fail-safe in operation. It can be constructed from sheet steel or any other material which would not be deleteriously affected by the fluids normally passing therethrough. Of course, other modifications beyond those already described might occur to a skilled person in the art and accordingly the protection to be afforded this invention is to be determined from the scope of the claims appended hereto.

The embodiments of the invention in which an exclusive property or privilege is claimed are defined as follows:

1. A combination funnel and vent cap comprising:
   a) a funnel body including an upper wall portion adapted for attachment to a fluid-receiving container;
   b) a cap member including a top wall and a peripheral skirt depending therefrom, said skirt being sized to peripherally encompass said upper wall portion of said funnel body when said top wall is in a closed position preventing access to said funnel body;
   c) hinge means between said skirt and said funnel body pivotally connecting said cap member to said funnel body and permitting movement of said cap member between said closed position and an open position;
   d) latch means opposite said hinge means for loosely securing said cap member to said funnel body; and
   e) at least one of said hinge means and said latch means being provided with means to permit said cap member to rise slightly relative to said funnel body for venting purposes without providing access to said funnel body.

2. The combination of claim 1 wherein said funnel body includes a lower wall portion converging downwardly below said upper wall portion.

3. The combination of claim 2 wherein said funnel body upper wall portion has a rear wall said hinge means comprises a pair of spaced apart rearwardly extending first bracket members secured to said rear wall of said funnel body upper wall portion, a pair of spaced apart forwardly extending second bracket members secured to an inner surface of an inner surface of a rear portion of said skirt of said cap member, and a pivot rod interconnecting said first and second bracket members.

4. The combination of claim 3 wherein said first bracket members are vertically elongated, each having a vertically extending slot therethrough for vertically guiding said pivot rod whenever said cap member rises relative to said funnel body.

5. The combination of claim 4 wherein said latch means comprises a first U-bolt secured to a front wall of said funnel body upper wall portion, a second U-bolt secured to a front portion of said skirt of said cap member and a lock member for releasably latching said U-bolts together.

6. The combination of claim 4 wherein said latch means comprises a first U-bolt secured to a front wall of said funnel body upper wall portion, a second U-bolt secured to a front portion of said skirt of said cap member, at least one chain link loosely attached to one of said U-bolts, and a lock member for releasably latching said at least one chain link to the other of said U-bolts.

7. The combination of claim 3 wherein said second bracket members are vertically elongated, each having a vertically extending slot therethrough for guided movement on said pivot rod whenever said cap member rises relative to said funnel body.

8. The combination of claim 7 wherein said latch means comprises a first U-bolt secured to a front wall of said funnel body upper wall portion, a second U-bolt secured to a front portion of said skirt of said cap member and a lock member for releasably latching said U-bolts together.

9. The combination of claim 7 wherein said latch means comprises a first U-bolt secured to a front wall of said funnel body upper wall portion, a second U-bolt secured to a front portion of said skirt of said cap member, at least one chain link loosely attached to one of said U-bolts, and a lock member for releasably latching said at least one chain link to the other of said U-bolts.

10. The combination of claim 7 wherein the distance from said funnel body upper rear wall to said pivot rod is greater than the distance from the lower edge of said rear portion of said skirt of said cap member to an upper end of said slot.

11. The combination of claim 3 wherein said latch means comprises a first U-bolt secured to a front wall of said funnel body upper wall portion, a second U-bolt secured to a front portion of said skirt of said cap member, at least one chain link loosely attached to at least one of said U-bolts, and a lock member for releasably latching said at least one chain link to the other U-bolt and permitting limited pivoting of said cap member on said hinge means relative to said funnel body.

12. The combination of claim 3 and including resilient spacer means extending along spaced portions of apart said upper edge of said funnel body upper wall portion, said cap member top wall resting on said spacer means when said cap member is in said closed position.

13. The combination of claim 3 and including a perforate filter plate within said funnel body, permitting fluids to pass therethrough while preventing unwanted solids from passing therethrough.

14. The combination of claim 3 and including a perforate filter plate within said funnel body, said plate having a vertically oriented overflow tube extending therethrough, said tube terminating below the upper edge of said funnel body upper wall portion.

15. The combination of claim 3 and including a perforate filter plate within said funnel body, a vertically oriented overflow tube extending through said plate and terminating below the upper edge of said funnel body upper wall portion, and a frustoconical diffuser plate spaced below and connected to a lower end of said tube.

16. The combination of claim 3 wherein said second bracket members are positioned adjacent a lower edge of said rear portion of said skirt of said cap member.

17. An emergency venting cap and funnel assembly comprising:
 a) a funnel body adapted for attachment to a fluid-receiving container and including a peripherally upstanding upper wall portion, a lower wall portion converging downwardly below the upper wall portion, and a perforate filter plate within the lower wall portion;
 b) a cap member including a top wall and a skirt depending therefrom, said skirt being sized to peripherally encompass said upper wall portion when said cap member is in a closed position preventing access to said funnel body;
 c) hinge means pivotally connecting said cap member to said funnel body and permitting movement of said cap member between said closed position and an access-providing open position, said hinge means including a pair of first, vertically elongated and slotted rearwardly extending bracket members on a rear wall of said body upper wall portion, a pair of second forwardly extending bracket members on an inner surface of a rear portion of said skirt of said cap member, and a pivot rod interconnecting said first and second bracket members and slidably guided by the slots of said first bracket members; and
 d) latch means opposite said hinge means for loosely securing said cap member to said funnel body, said latch means including a first U-bolt on a front wall of said funnel body upper wall portion, a second U-bolt on a front portion of said skirt of said cap member, at least one chain link connected to one of said U-bolts and a lock member for releasably latching said at least one chain link to the other of said U-bolts; whereby
 e) an overpressure condition within a container to which said funnel body is attached will cause said cap member to rise slightly relative to said funnel body within limits imposed by said hinge means and said latch means for venting the container while preventing unwanted access thereto through said funnel body.

* * * * *